G. GODDU.
EYELETING MACHINE.
APPLICATION FILED APR. 22, 1903.

934,066.

Patented Sept. 14, 1909.
9 SHEETS—SHEET 3.

WITNESSES
Edward S. Day
A. E. White

INVENTOR
George Goddu
by his Attorneys
Phillips Van Everen Fish

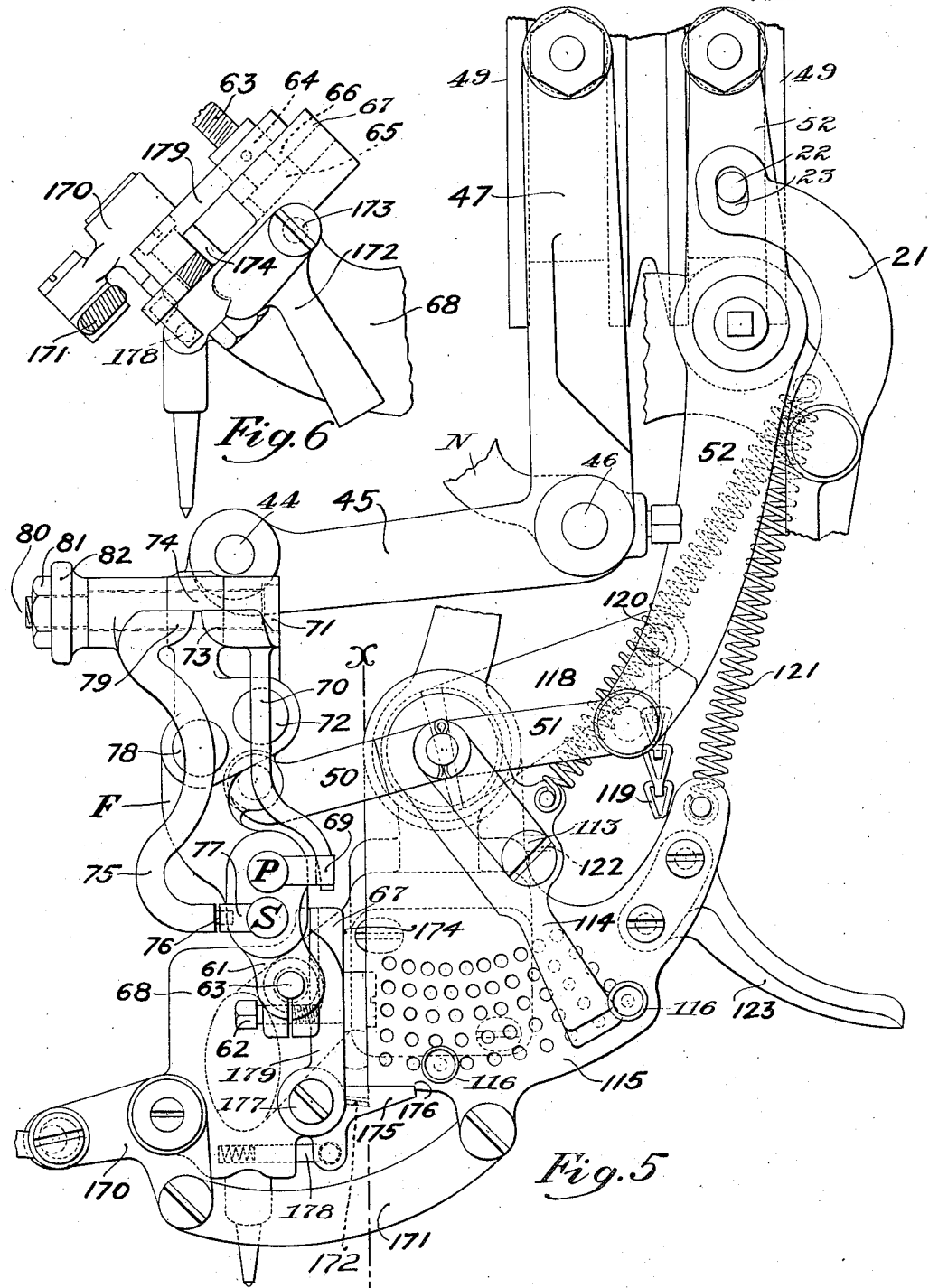

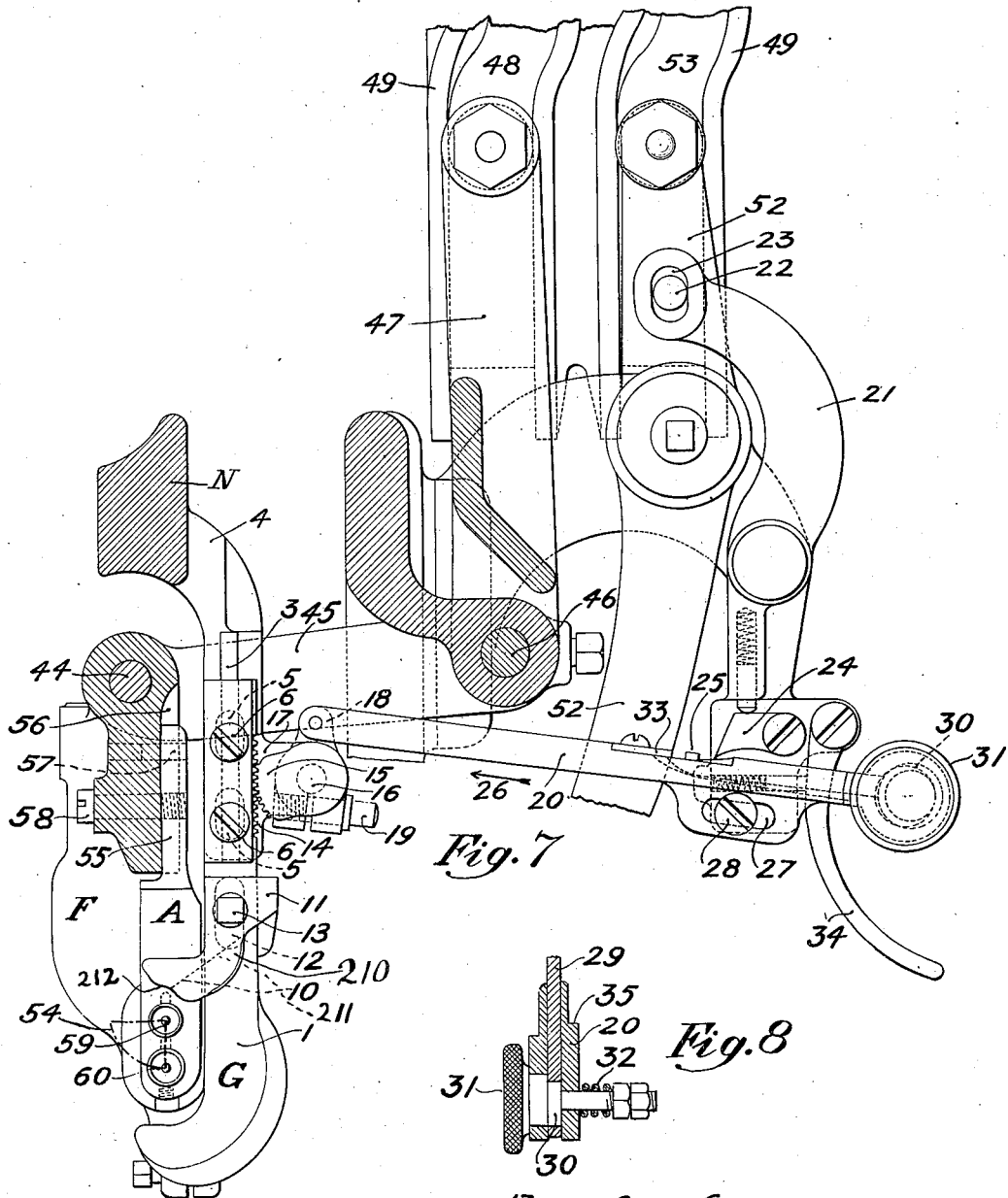

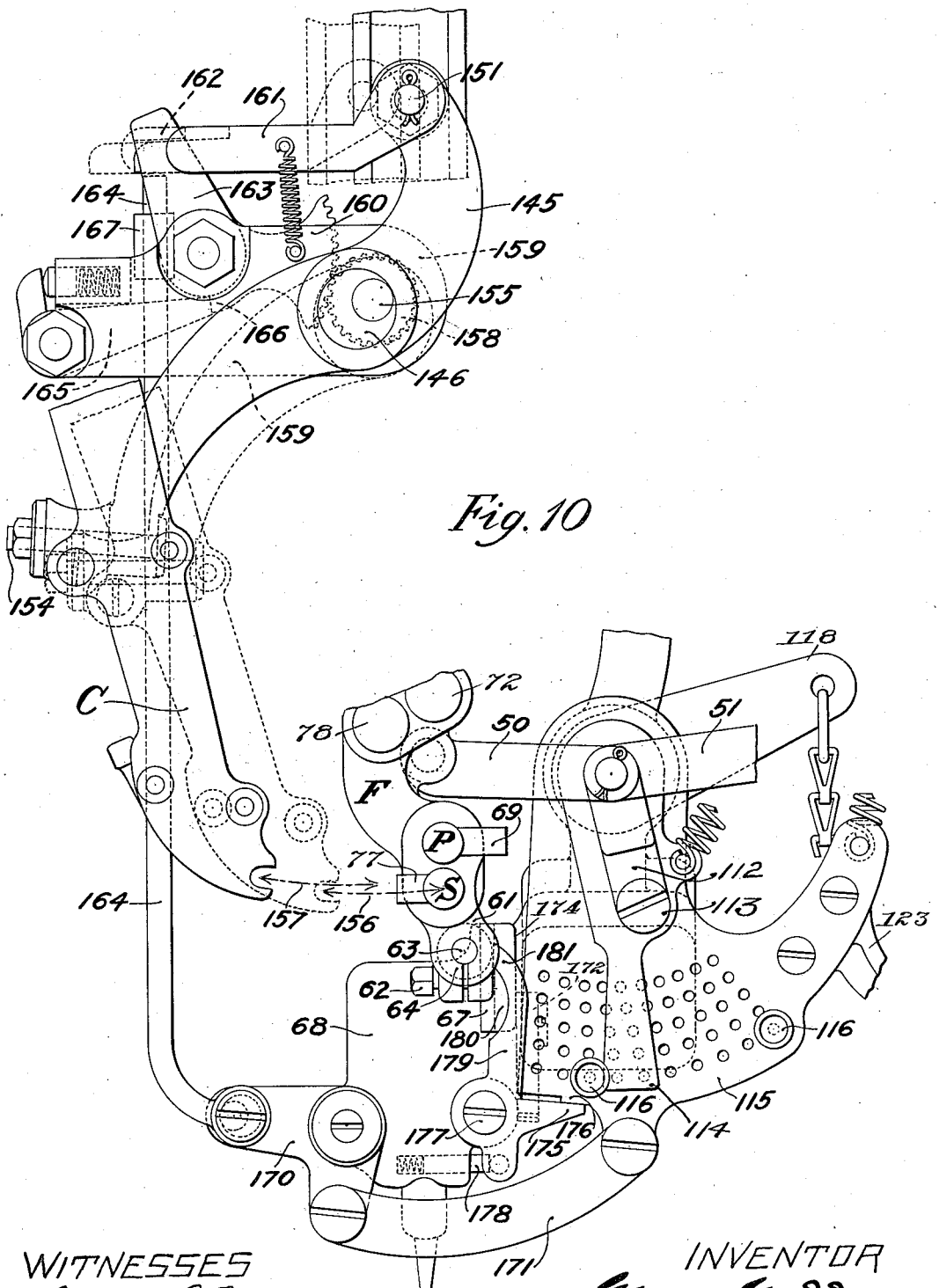

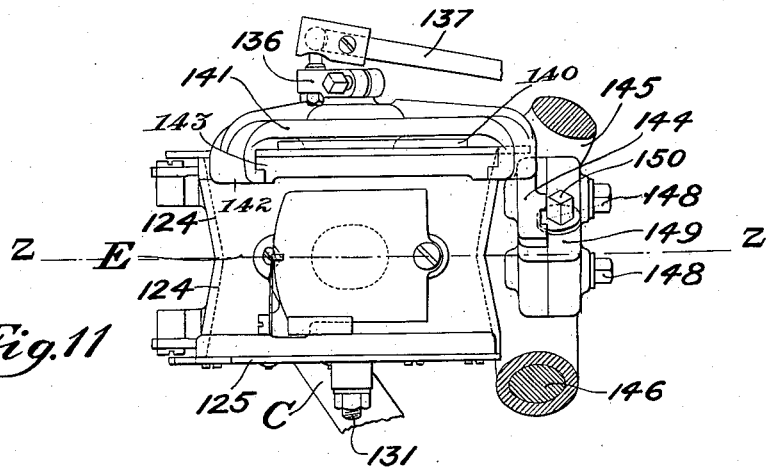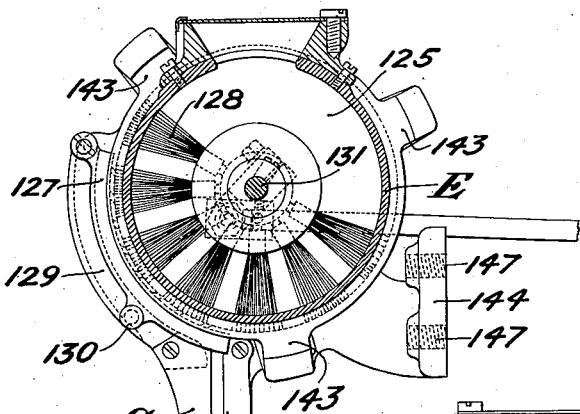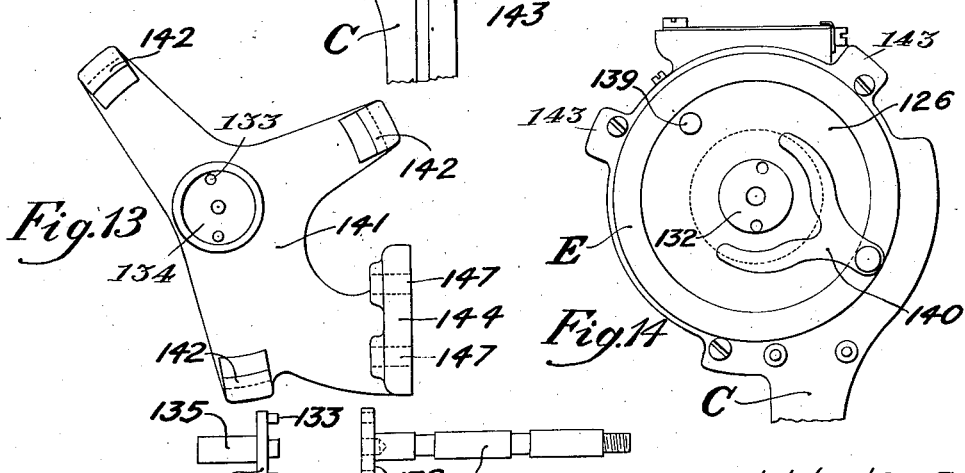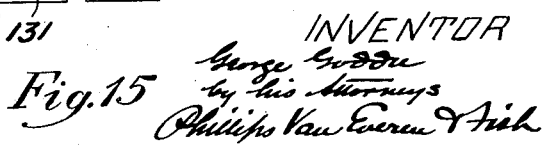

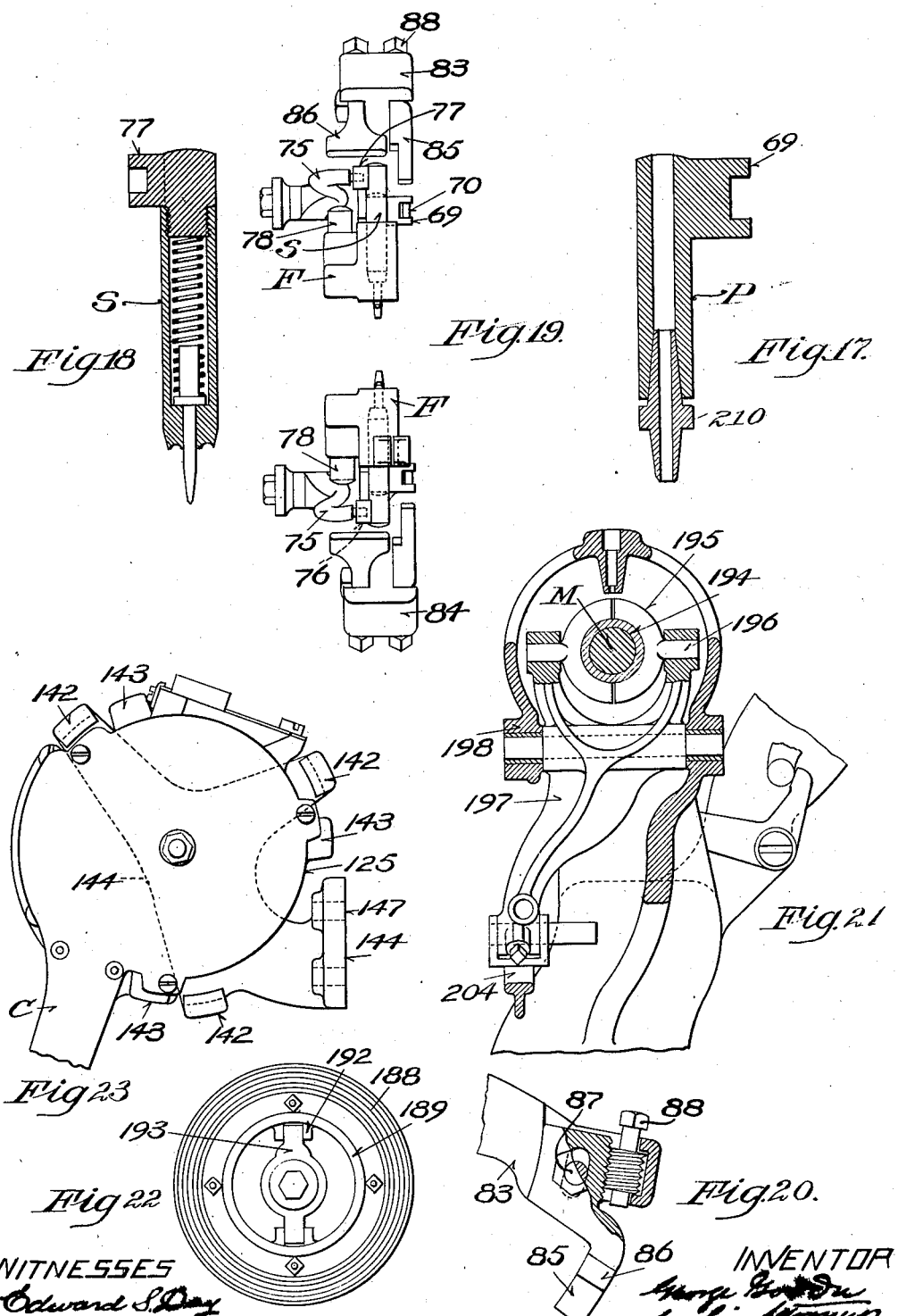

G. GODDU.
EYELETING MACHINE.
APPLICATION FILED APR. 22, 1903.
934,066.
Patented Sept. 14, 1909.
9 SHEETS—SHEET 9.
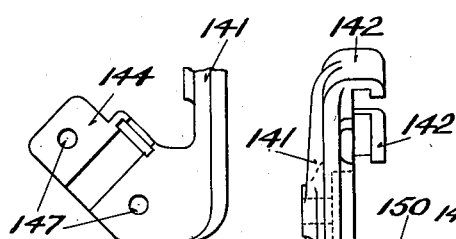
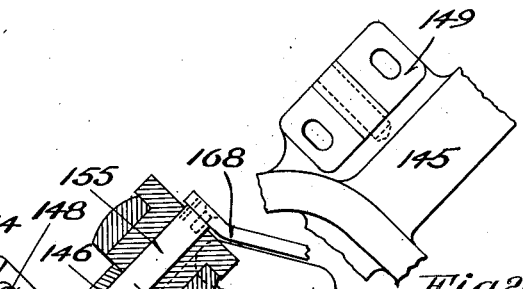
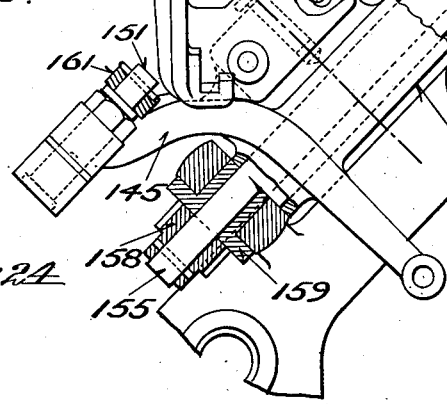
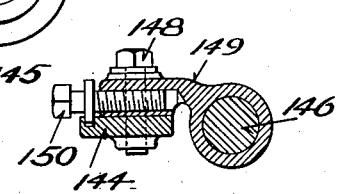
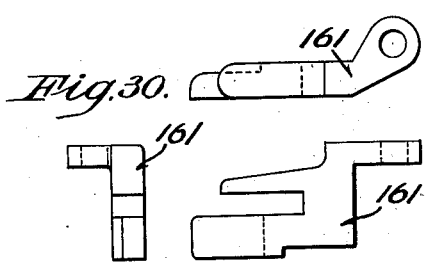
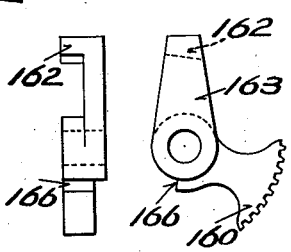
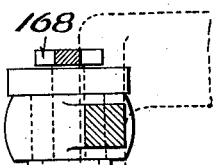
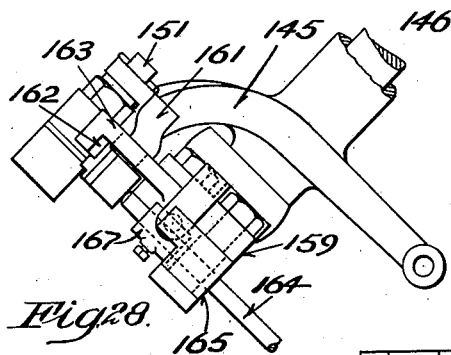
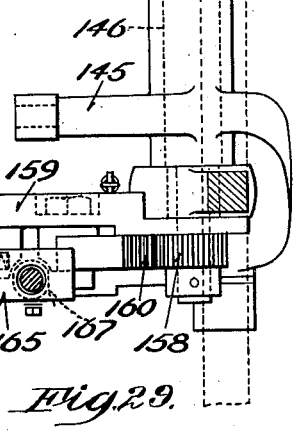
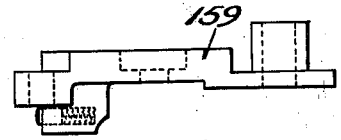
WITNESSES
Edward S. Day
Farnum F. Dorsey
INVENTOR
George Goddu
by his Attorneys

UNITED STATES PATENT OFFICE.

GEORGE GODDU, OF WINCHESTER, MASSACHUSETTS, ASSIGNOR TO UNITED SHOE MACHINERY COMPANY, OF PATERSON, NEW JERSEY, A CORPORATION OF NEW JERSEY.

EYELETING-MACHINE.

934,066.      Specification of Letters Patent.      Patented Sept. 14, 1909.

Application filed April 22, 1903. Serial No. 153,822.

*To all whom it may concern:*

Be it known that I, GEORGE GODDU, a citizen of the United States, residing at Winchester, in the county of Middlesex and State of Massachusetts, have invented certain new and useful Improvements in Eyeleting-Machines; and I do hereby declare the following to be a full, clear, and exact description of the invention, such as will enable others skilled in the art to which it appertains to make and use the same.

The present invention relates to an improvement in eyeleting machines.

The objects of the present invention are to reorganize and improve the construction, organization and mode of operation of eyeleting machines, and more particularly the eyeleting machine illustrated and described in Letters Patent of the United States No. 683,488, October 1, 1901, granted upon the application of Marshall Henry Pearson.

To the above ends the present invention consists in the devices and combinations of devices hereinafter described and claimed.

Figure 1:
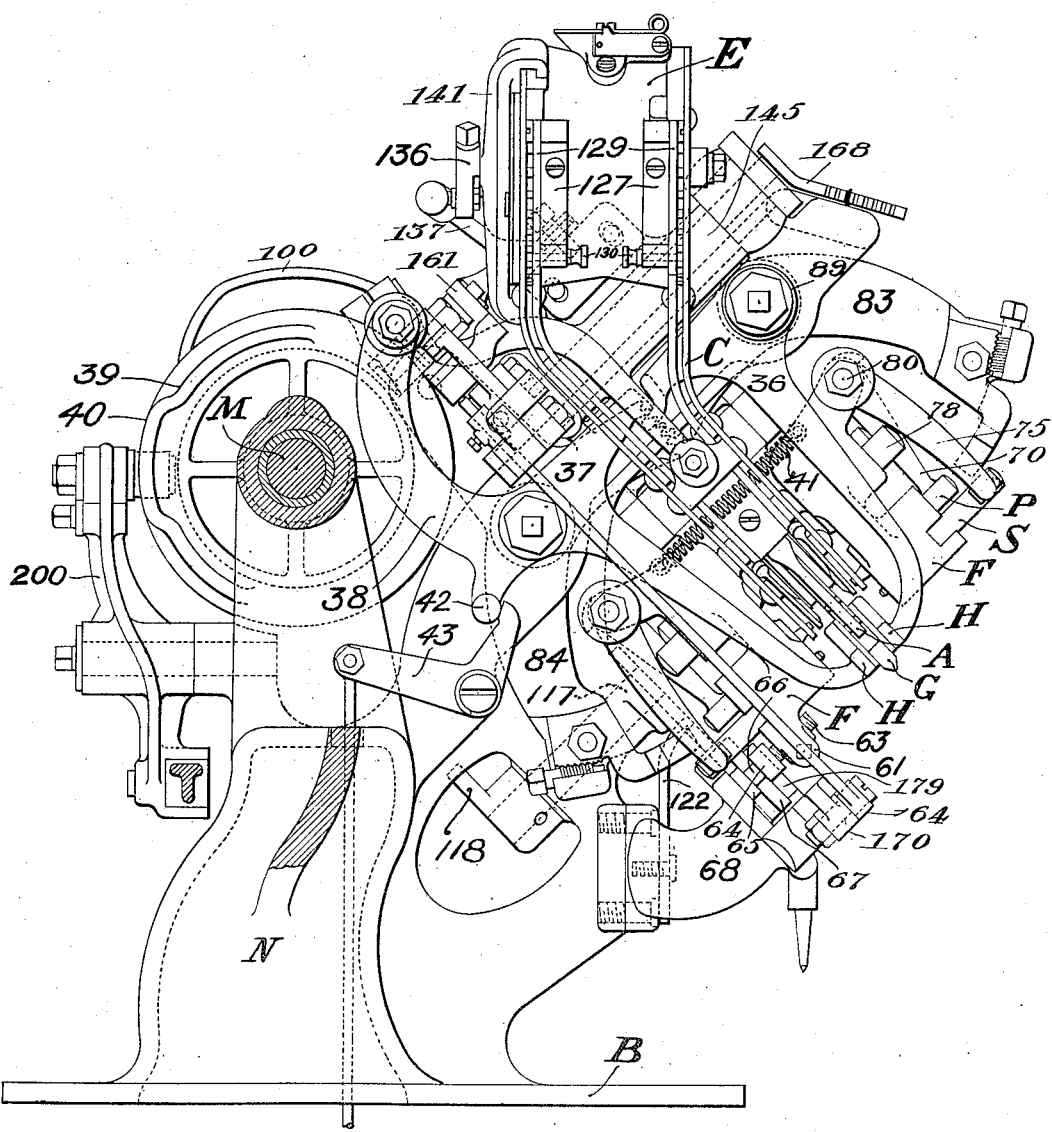
Figure 2:
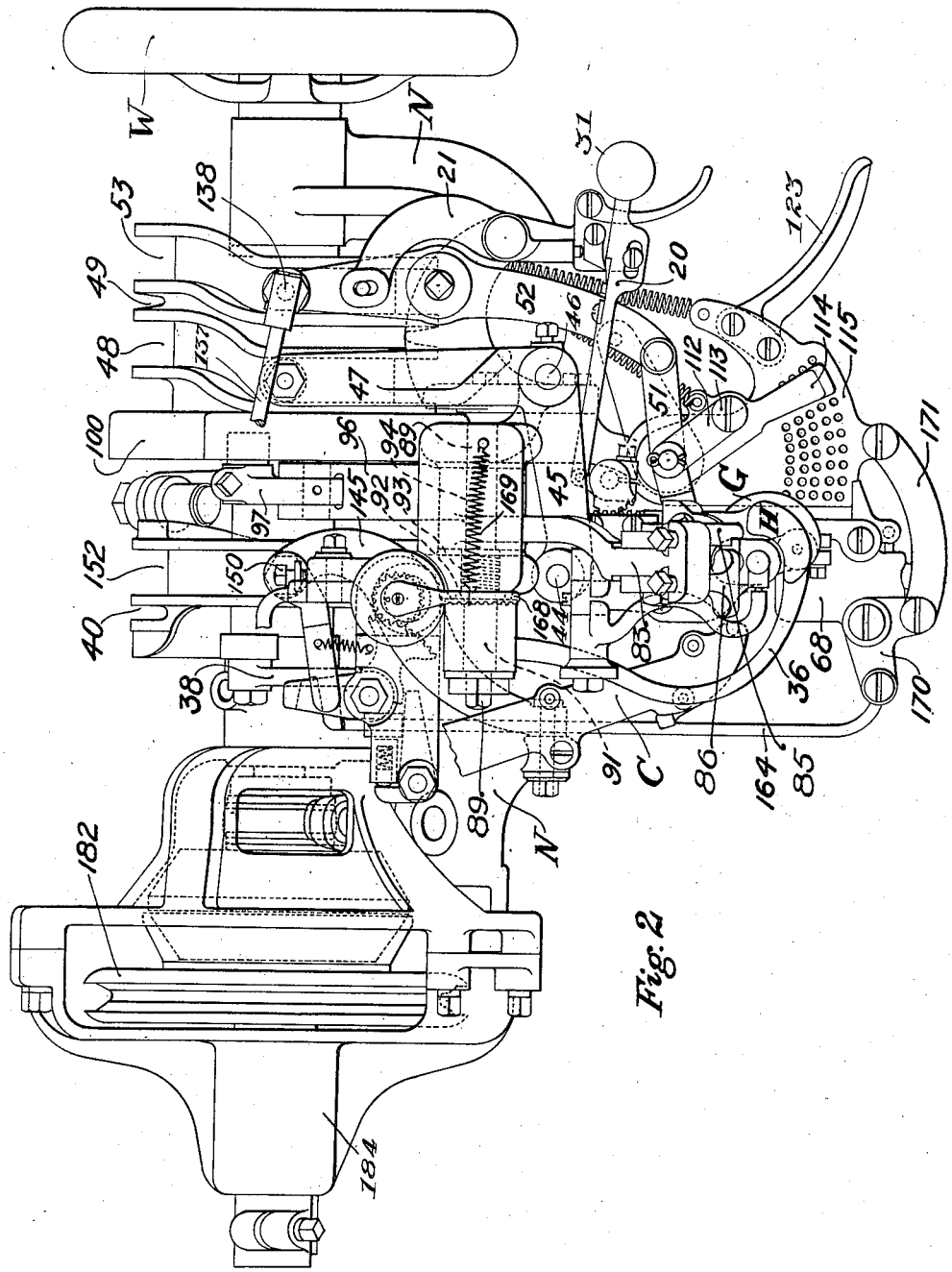
Figure 3:
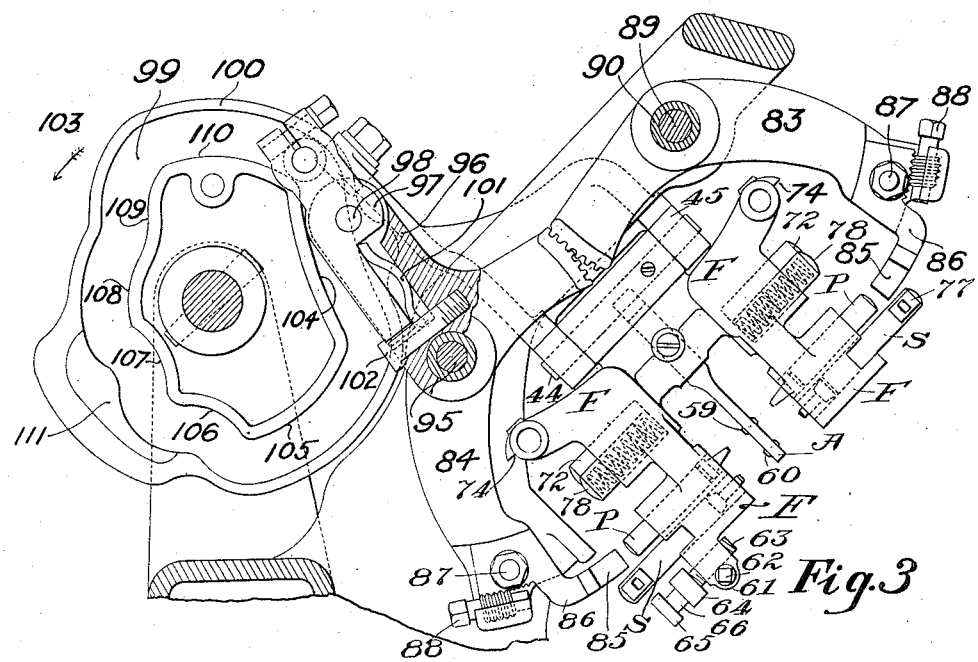
Figure 4:
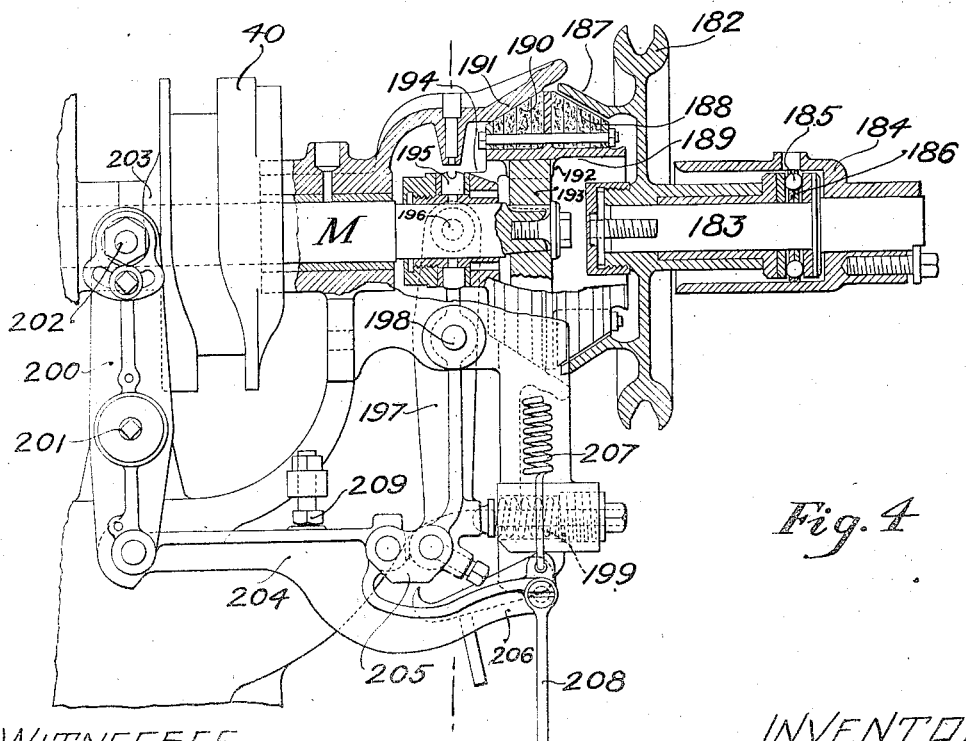

In the accompanying drawings illustrating the preferred form of the present invention, Figure 1 is a side elevation of the machine looking from the left with the clutch mechanism removed; Fig. 2 is a plan of the machine looking down at the machine from the front at an angle of 45° to the horizontal, with the eyelet pot removed; Fig. 3 is a sectional elevation showing the feed frame or punch and eyelet set support and the operating mechanism for the punches and eyelet sets; Fig. 4 is a rear elevation partially in section showing the clutch mechanism; Fig. 5 is an enlarged 45° plan showing the feeding, and feed adjusting mechanisms; Fig. 6 is a section on the line $x$—$x$, Fig. 5; Fig. 7 is a 45° plan of the variable gage operating mechanism; Fig. 8 is a longitudinal section of the right-hand end of the link 20; Fig. 9 is a side elevation of the guide plate showing its mode of support and turned from an angle of 45° to the horizontal for convenience of arrangement on the drawings; Fig. 10 is a 45° plan of the eyelet chute throw-out mechanism; Fig. 11 is a plan of the eyelet pot and its support; Fig. 12 is a sectional elevation of the eyelet pot taken on the line $z$—$z$; Fig. 13 is an elevation of the eyelet pot support or bracket; Fig. 14 is a rear elevation of the eyelet pot, Figs. 15 and 16 illustrate the two portions of the brush shaft, Fig. 17 is a vertical section of one of the punches; Fig. 18 is a vertical section of one of the eyelet sets; Fig. 19 is a front detail view of the operating instrumentalities and their supporting and actuating members; Fig. 20 is a detail view, partly in section, of the adjusting mechanism for one of the face pieces 36; Fig. 21 is a vertical section showing a portion of the clutch mechanism; Fig. 22 is a detail of the same part; Fig. 23 is a front view of the eyelet pot and its bracket; Fig. 24 is a side elevation of the mechanism for supporting and actuating the eyelet pot and eyelet chutes; Figs. 25, 26 and 27 are detail views of the means for adjusting the eyelet pot bracket; Fig. 28 is a detail elevation of part of the mechanism for throwing out the eyelet feed; Fig. 29 is a detail view of the same parts; Fig. 30 shows detail views of the pawl 161; Fig. 31 shows detail views of the segmental pinion 160 and its operating lever; Fig. 32 is a detail view of the bracket 159.

The present machine, like the machine of said patent, is organized and arranged to punch two holes in the opposite sides of the upper of a shoe and then to set two eyelets in those holes and to feed the work.

The principal features of the present invention reside in the improved construction and organization of the machine and in certain auxiliary devices employed in connection therewith.

Before proceeding to a detailed description of the various parts of the machine, it will be convenient to refer to the principal operative parts and their general mode of operation and relative arrangement and then to proceed with a detailed description of their operating mechanisms and their relative arrangement to the operative devices of the machine.

The machine illustrated in the drawings has a frame N which is provided with bearings for the main shaft M adapted to be connected at one end with a grooved pulley which receives a belt by which the machine may be driven from any suitable or convenient source of power, and provided upon the other end with a hand wheel W. The frame is provided with a base B which is adapted to be secured to a table.

In the machine of the said patent the work was presented to the machine in a vertical position which required the operator to hold his hands in an unnatural and constrained position, besides which, owing to the arrangement of the parts of the said machine, it was not convenient for the operator to present the opposite sides of the upper in exact alinement, because of the angle at which the work was held with relation to the line of vision. In the present machine it is proposed to present the work in an inclined position to the machine, and to that end the various devices operating upon the work have been turned toward the operator to an angle of 45° so that the work may be presented to the machine by holding the hands in a natural and easy extended position and so that the line of vision of the operator is normal to the work presented to the machine, as a result of which the operator is enabled conveniently to hold the two layers of work in alinement with each other and to maintain them in such alinement. The machine, like the machine of the said patent, comprises oppositely disposed punches P and oppositely disposed eyelet sets S arranged in bearings in a support or feed frame F with the anvil or die plate A also supported by said support or feed frame, arranged between the oppositely disposed punches and eyelet sets. The feed frame, however, is mounted at an angle of 45° to the vertical for the purpose above set forth. The clamping devices or holders H are arranged to engage the work on the opposite sides of the guide plate G.

In presenting the work to the machine the holders H are lifted by a connection with a treadle and the opposite sides of the upper are laid against the opposite sides of the guide plate G with their edges against the edge guide mounted upon said guide plate. The holders are then permitted to engage and hold the material in position and the machine is set in operation by tripping a clutch, hereinafter described. The punches first advance and punch two holes in opposite sides of the upper in alinement with each other, then the feed frame F rises to bring the sets into the position previously occupied by the punches, and the eyelet chutes C are advanced and present eyelets to the eyelet sets S which set such eyelets in the holes in the material, the eyelet chutes withdrawing as the sets advance. After the eyelet sets have set the eyelets in the work they are released slightly but still held in engagement with the eyelets, and then the feed frame F is moved to the left to feed the materials the desired distance between two successive eyelet holes. The feed frame then makes its return or back feed movement, bringing the punches back to their original positions and the operations are repeated. When it is desired to punch holes in the upper without setting eyelets in such holes, as in the upper part of the upper to receive the lacing hooks, the position of the path of motion of the eyelet chutes is changed so as to prevent them from presenting eyelets to the eyelet sets, and the only difference in the operation of the machine is that the eyelet sets operate merely to feed the upper without setting any eyelets therein.

The guide plate G consists of a plate 1 against the opposite sides of which the work is adapted to be held, the lower end of the plate 1 being extended around beyond the punches and eyelet sets for a purpose described in connection with the description of the clamping devices or work holders H. The plate 1 is supported by a shank 2 which is grooved longitudinally to receive a feather 3 projected from the surface of the projection 4 from the frame N of the machine to which the said shank 2 is adapted to be secured. The shank 2 of the guide plate G is provided with two elongated holes 5 through which pass screws 6 by means of which the guide G is secured to the said projection 4. The screws 6 bear upon a spring 7 which elastically presses the friction plate 8 faced with leather 9 against the surface of the shank 2 on the guide. This construction affords a rigid support for the guide plate G and at the same time permits the said guide plate to be moved longitudinally under the said friction plate 8. The edge guides 10 are formed upon a sliding block 11 which fits the shank 2 of the said plate G. The guide plate is provided with an elongated hole 12 through which a screw 13 passes freely, being screwed into the under side of the block 11. By tightening the screw 13 the block 11 and the guides 10 secured thereto may be secured in any desired position on the shank 2 of the guide plate. The guides 10 are projected beyond the edge of the guide plate 1 approximately to the central line joining the punches and sets so that the work may be accurately located with relation to said punches and sets substantially as illustrated and described in the said patent, being provided also with downwardly extending work-guiding plates 210 similar in construction and operation to the corresponding parts illustrated in the said patent.

Means are provided for moving the guide plate with its attached edge guides during the operation of the machine to vary its position with relation to the edge of the materials in which the holes are punched and eyelets set in the materials. To accomplish this result the side of the shank of the guide plate is provided with a rack 14 engaged by the teeth of a segmental pinion 15 which is provided with a shank 16 mounted in a bearing in the ear 17 projected from the side of the frame member 4. The opposite end of the shaft 16 has secured to it an arm 18 which is adjustably clamped thereon by means of the clamp screw 19. The arm 18 is connected by means of a link 20 with means for actuating the arm to vary the position of the guide plate and edge guide. The link 20 is connected with the feed mechanism in the following manner:—A lever 21 pivoted upon a portion of the frame N of the machine is connected with the feed cam lever 52 hereinafter described, by means of a pin 22 which is secured to said lever and which engages a slot 23 in the said lever 21. The oscillations of the feed cam lever 52 impart oscillations to the lever 21 which, upon its lower end, carries a pawl 24 adapted to engage a tooth 25 carried by said link 20. When the position of the tooth is such that the pawl 24 will engage it, the link 20 will be moved by the lever 21 in the direction of the arrow 26, thereby oscillating the segmental pinion 15, and moving the guide plate with its attached edge guides 10 downward to decrease the distance of the holes and the eyelets set therein from the edge of the materials. The pawl 24 is pressed by means of a spring in a direction to cause it to slide upon the surface of the link 20 so that it will engage the tooth 25 when the same is in position to be engaged. The link 20 is provided with an elongated hole 27 through which passes a screw 28 screwed into the lower end of the lever 21, and when the present devices are inoperative the said lever 21 moves back and forth while the link 20 stands fast, the said pin and slot connection affording means for supporting the link 20 in operative relation to the lever 21. The tooth 25 is mounted on a tooth slide 29 which is carried in a groove in the side of the link 20, the tooth slide 29 being provided with an aperture which is engaged by the eccentric portion 30 of the adjusting pin 31 which is mounted in bearings in the end of the said link 20. The pin 31 is extended through the said link 20 and upon its end is provided with a spring 32 which acts frictionally to hold the pin 31 in whatever adjusted position is given it. The opposite end of the tooth slide 29 is held in the groove in the link 20 by means of a plate 33 secured to the link 20. By turning the adjusting pin 31 in its bearing in the end of the link 20 the tooth slide may be moved back and forth in the link 20, thereby varying the position of the tooth with relation to the pawl. Thus when the tooth 25 is moved farther to the right the edge guides 10 will, upon the next oscillation of the lever 21, be moved farther downward in order to diminish the distance of the hole and the eyelet set therein from the edge of the materials.

It will be understood that the guide plate and its edge guides are normally held by their frictional holding means in their lowermost positions, and when it is desired to vary the position of the holes in the work the lever 34, pivotally mounted upon the lower end of the lever 21, will be moved to the right, thereby moving the link 20 to the right, turning the pinion 15 and lifting the guide plate and its edge guides to increase the distance of the holes from the edge of the materials. A light spring is employed which normally holds the said lever 34 in a position to engage the shoulder 35 of the link 20.

In setting eyelets in a shoe upper, it is the practice in most cases to set the lowermost eyelets with a somewhat greater "spread" than the succeeding ones, that is, at a somewhat greater distance from the edge of the lacing slit than the others, and thereafter it is desired to set the eyelets in the upper at a uniform distance from the edge of the lacing slit. In setting eyelets with the present machine the upper is presented to the machine in the manner in which it is shown as being presented to the machine in the said patent, that is, so that the eyelets at the bottom of the lacing slit are first set and then the rest follow up the slit. Therefore when it is desired to set eyelets in uppers with a spread on the first eyelets, the lever 34 is moved to the right to lift the guide plate and edge guides as described, the work is entered and placed with its edges against the edge guides, and then the machine is set in motion and the holes first punched in the materials are punched at a greater distance from the edge of the lacing slit, and after the first holes have been punched and the work fed by the feeding mechanism the movement of the feed cam lever 52 actuates the lever 21 causing its pawl 24 to engage the tooth 25 so as to restore the guide plate and its edge guides to their normal positions. It is to be observed in this connection that, while in the machine of the drawings it is proposed to move both the guide plate and the edge guides, the present invention contemplates the moving of the edge guides to vary the distance from the edge of the materials during the operation of the machine, and in its broader aspects it is a matter of indifference whether the guide plate be moved at the same time or not.

It will be noted that the surfaces of the edge guides are in two portions arranged at an angle, the principal part 211 of each edge being inclined to the direction of feed and to the forward portion 212. This is a feature which was present in the machine of the said patent and which, in connection with the means for varying the position of the edge guides, affords a convenient means of varying the position of the first few eyelets set in the bottom of the lacing slit. By presenting the work to the machine with the edges of the work parallel to the inclined edges of the guides the distance of the holes punched in the work by the punches from the edges of the work is diminished, thus by turning the work this distance may be increased. It will thus be seen that by a little manipulation of the work during the setting of the first few eyelets the eyelets may be set at gradually decreasing distances from the edge of the upper until the normal distance is reached, after which the eyelets will be set at such normal distance from the edge of the upper.

The work holders or clamping devices H are arranged upon the opposite side of the feed frame from that which they occupy in the machine of the said patent, being extended down on the left side thereof as viewed in Fig. 2 instead of upon the right side. It has been found that the arms carrying said work holders or clamping devices interfered with the vision of the operator in presenting the work to the machine, and by moving them around to the other side of the feed frame this is obviated. The work engaging faces of the work holders H are covered with leather and are extended below and to a position opposite the front of the punches and sets in order to hold the work better. It has been found in the operation of the machine of the said patent, in which the work holders or clamps engage the work entirely on the right of the punches and sets that after the work had been fed to the position to punch the last hole or set, the last eyelet in the upper part of the upper, the holders or clamping devices no longer engaged the material, so that after the feeding of the upper to the position to set such eyelets there was no means for holding the upper during the movement of the feed frame to move the eyelets and sets to the position of the punches, which resulted in imperfect work. According to the present construction the work clamps are extended beyond the sets so that the work will be held by the work clamps to the very last hole in the upper so that this objection has been overcome. The work holders are mounted upon bell crank levers 36 and 37 having their upper ends articulated together, pivoted upon a portion of the frame of the machine, the lever 37 being provided with a rearwardly extended arm 38 carrying a cam roll which engages a cam surface 39 on the cam disk 40 mounted on the main shaft M of the machine. A spring 41 attached to the levers 36 and 37 operates normally to hold the work clamps against the material to hold the same in position in the machine. A downwardly extending lug or projection 42 from the said bell crank lever 37 is adapted to be engaged by one arm of a bell crank lever 43 which is connected by a link with a treadle, not shown, whereby the work holders may be separated to enter and remove the work from the machine. The above described arrangement and the shape of the cam surface 39 are such that the work holders are held in engagement with the work at all times during the operation of the machine, except during the time the material is being fed, at which time the work holders are lifted to free the material for such feed movement.

The feed frame F constitutes the support for the punches, eyelet sets and anvil and associate parts. The feed frame carries upon its rear end a shaft 44, the extended ends of which enter holes in the forked bell crank lever 45 pivoted at 46 to the frame of the machine and having the rearwardly extended arm 47 which carries a cam roll which engages a cam path 48 in the cam disk 49 secured to the main shaft M of the machine. The above-described arrangement is such that after the holes have been punched in the materials by the punches the lever 45 is oscillated to raise or move the feed frame rearwardly to bring the eyelet sets to the position previously occupied by the punches. The feed frame F is connected by means of the links 50 and 51 with the feed cam lever 52 in a manner substantially similar to that disclosed in the said patent. The feed cam lever 52 is pivotally mounted upon a portion of the frame of the machine, its arm carrying a cam roll which engages a cam path 53 in the cam disk 49. This arrangement and the shape of the cam path are such that after the feed frame has been lifted to move the eyelet sets to the position previously occupied by the punches, and the eyelet sets have operated to set eyelets in the upper, the feed frame is moved to the left as viewed in Figs. 2, 5, and 7 to feed the work the desired distance, after which the feed frame is dropped and returned to its original position along the path 54.

The anvil or die plate A is mounted between the oppositely disposed punches and sets, being provided with a shank 55 which is received in a groove 56 in the feed frame F, being secured in place by means of a pin 57 which engages a hole in said shank 55 and a screw 58 which screws into another hole in the shank 55. The anvil or die plate A is provided with a movable punch block 59 and a movable setting die 60, which are supported in said anvil or die plate A.

It has been found by experience with the machine of the said patent that it frequently is desirable to set one eyelet in one side of the upper with said machine, but that such use thereof imposes such a strain upon the supports for the feed frame as soon racks and loosens it. The lower side of the feed frame is provided with an ear 61 which is provided with a screw-threaded aperture therethrough and is slotted, a locking screw 62 being provided for clamping the parts thereof together upon a screw-threaded stud 63 which is adapted to be screwed into the hole in the ear 61. The stud 63 is projected downwardly below the feed frame and is provided upon its lower end with enlargements or collars 64 and 65 making a groove 66 therebetween which is engaged by a projection 67 from the bracket 68 secured to the frame N of the machine. The stud 63 by the engagement of its groove with the projection 67 affords means for steadying the feed frame or support to resist the thrust of the punches and eyelet sets. Thus if only the upper eyelet set was operating, material being presented on one side only of the anvil or die plate A, the pressure of the operating mechanism for the eyelet set tending to move the feed frame out of its normal position would be resisted by the said stud or projection. The projection 67 engages the groove 66 of the stud 63 during the time the punches are operating, while the feed frame or support is rising to move the eyelet sets to the position previously occupied by the punches and during the time the sets are operating, but as is obviously not necessary it does not engage the same during the time the feed is taking place or during the back feed or return movement of the feed frame to its original position.

The punches P are oppositely disposed in the feed frame or support F being mounted in bearings on opposite sides of the anvil or die plate A. The eyelet sets are also oppositely disposed with relation to the anvil or die plate A, being mounted in bearings in the feed frame adjacent to the bearings for the punches. The punches are provided upon one side with ears or projections 69 which are slotted to receive the ends of the spring arms 70 pivoted at 71 upon the studs 80 mounted in the feed frame F. The spring arms are acted upon by spring cups 72 which are received in bearings in the feed frame and which contain springs normally acting to press the spring cups toward the spring levers. By this means the punches are acted upon by the springs in a direction to tend to hold them in their retracted positions out of engagement with the work. The levers 70 are provided with ears 73 which engage stop projections 74 on the bearings for the pivots of the said levers, the projections serving to limit the outward movement of the spring arms 70 under the influence of the spring cups 72. The eyelet sets are provided with similar means for retracting them, being the levers 75 which are provided upon their ends with pins 76 which engage elongated holes in the sides of projections 77 from the sides of the eyelet sets. The spring arms 75 are also pivoted on the studs 80, and are acted upon by similar spring cups 78 and provided with similar projections 79 which engage the projection 74. A locking nut 81 and a thumb nut 82 are provided to secure the stud 80 in place and afford a convenient means for removal of the pin 80 so that the arms 70 and 75 may be removed when it is desired to take the eyelet sets out for any purpose, as for changing them for others of different size. The punches cannot be removed in this way because of the interference of the operating levers therewith, without dismantling said levers, and therefore the punches are provided with wrench-engaging portions 210 so that they may be removed from their shanks and taken out toward the anvil plate without removing the shanks from the feed frame or support.

The punches and eyelet sets are actuated by means of bell crank levers 83 and 84 which have their upper ends provided with segmental gears so that they move in unison with each other. The lower ends of the operating levers 83 and 84 are provided with adjustable face pieces. The face piece 85 of the lever 83 which is adapted to engage the projection 69 and operate one of the punches and the face piece 86 which is adapted to engage and actuate the corresponding eyelet set are secured to the end of the lever 83 upon opposite sides thereof by means of a bolt 87 which is extended through slotted portions in the face pieces and through a hole in the end of the lever 83. The shanks of the face pieces are curved upon the arc of a circle of which the stud 89 is the center and are received in correspondingly shaped recesses in the end of the lever 83. The outer edges of the face pieces are provided with segmental worm threads and an adjusting screw 88 is provided for each of them which is received between the worm threaded surface of the face piece and a cavity in the end of the lever 83. See Fig. 20. By loosening the bolt 87 each of the face pieces 85 and 86 may be adjusted to the proper position with or without adjustment of the other face piece and after the desired position has been secured the tightening of the bolt 87 secures the face pieces rigidly in position. The face of the face piece 86 is broad so that it may remain in contact with the end of the eyelet set during the movement of the feed frame in the manner in which the machine of the said patent operates. The lever 84 is provided with face pieces for the punch and eyelet sets similar in all respects to the face pieces of the lever 83.

The arm 83 is mounted upon the shaft or stud 89 being bushed at 90 to afford a durable bearing on said stud. This stud also affords a pivotal support for the work holding lever 36. The stud 89 is well shown in Fig. 2. It consists of a horizontal portion 91 which affords the bearing for the hub of the lever 36, then it is provided with a collar 92, next with a screw-threaded portion 93 which screws into a portion of the frame of the machine, and then with a portion 94 which affords the bearing for the lever 83 and with a further portion which is received in another portion of the frame of the machine so that the said stud is supported at both ends and carries the lever 83 between said supports. This is because it is important that a durable and rigid bearing for the lever 83 should be provided. The stud 95 affording a bearing for the lever 84 is similar to the stud 89 affording a bearing for the lever 83. The portion of the frame which receives the studs 89 and 95 consists generally of two members projected upward and forward and united at the top as shown in section in Fig. 3. The lever 84 is provided with a rearwardly extended cam arm 96 carrying an auxiliary yielding arm 97 pivoted upon the stud 98 mounted in said arm 96. The rearwardly extended portion of the auxiliary arm 97 carries a cam roll which engages a cam path 99 in the cam disk 100 by means of which the levers 83 and 84 are actuated. The forwardly extended portion of the auxiliary arm 97 is received in a groove in the under side of the arm 96 and a spring 101 is interposed between the cam arm 96 and the forwardly extended auxiliary arm 97. A stud 102 engages the end of the arm 97 and holds it in position. The working strains upon the cam arm 96 are downward, therefore when the arms are operating to punch or set eyelets the spring 101 may yield and cause the work engaging tools to act yieldingly upon the materials. Of course the spring 101 is a stiff spring and it only yields under very considerable pressure.

The punch and set actuating cam 100 is shown in the position which it assumes when the machine comes to rest automatically, as hereinafter described in connection with a description of the clutch and its operating mechanism, and the machine is in position to enter and remove the work. The cam normally revolves in the direction of the arrow 103, and the first dip of the cam path, being the portion marked 104, operates to actuate the punches, and then release them, so as to permit their springs to raise them from engagement with the material. Then the dwell 105 of the cam path affords time for the lifting movement of the feed frame or support F to move the sets to the position previously occupied by the punches, then the dip 106 of the cam path advances the eyelet sets to take eyelets from the eyelet chutes, the next dip 107 sets the eyelets in the material after which the cam rises a little to relieve the pressure under which the eyelets were set, then the dwell 108 affords a time for the feed during which the eyelet sets are held lightly in engagement with the work, then the cam rises as at 109 to permit the eyelet sets to recede from the work, then the dwell 110 occurs which affords time for the return movement or back feed of the feed frame or support F to its original position. Where the heaviest strains are brought upon the cam during the setting of the eyelets the cam disk is reinforced with a steel block 111 which affords a durable wearing surface to perform this work. It will be seen that the means for actuating the punches and eyelet sets includes a jointed spring lever or yielding connection so that the punches and eyelets may yield under excessive strains. This is more or less important as it sometimes happens that after running a machine idly, that is, without any work in it, there will accumulate one or more eyelets on the lower eyelet set and if it were not for said yielding connection something would give way during the setting strains because of the unusual thickness upon which the eyelet sets would be caused to operate.

As before stated the feed mechanism and the feed regulating mechanism are constructed and operate substantially as in the machine of the said patent. The feed cam lever 52 is connected by means of the links 51 and 50 with the feed frame or support F. At the pivotal point of the links 50 and 51 is secured the link 112 which is pivoted at 113 upon the arm 114 which moves over the face of the quadrant plate 115, stop pins 116 being provided to limit its movement. The arm 114 is mounted upon the shaft 117 which is supported in a bearing in the frame of the machine and carries upon its lower end an arm 118 which is connected by means of a chain 119 with a treadle, not shown. By depressing the treadle the arm 114 is swung over the surface of the quadrant plate to increase the distance between successive eyelets substantially as in said patented machine. The arm 114 is returned to its original position by means of the spring 120. The quadrant plate is pivotally mounted concentrically with the shaft 117, and a spring 121 normally acts on the quadrant plate to move it to its right-hand position as illustrated in Fig. 5, a stud 122 shown also in Fig. 1 acting to limit the motion of the quadrant plate in this direction. The quadrant plate 115 is provided with a handle 123 by which it may be moved by hand if desired.

The means for delivering eyelets to the eyelet setting devices comprise the eyelet pot E, and the eyelet chutes C which convey eyelets from the eyelet pot to the eyelet setting devices. The eyelet pot E consists of a vessel cylindrical in general form having a contracted waist and mounted with its axis normally held in a horizontal plane. Specifically considered the eyelet pot E consists of a shell formed of two truncated cones having their smaller bases toward each other as shown in the drawings, particularly in Fig. 11. The eyelets are discharged from the eyelet pot at the opposite bases thereof into the eyelet chutes C. The inclined walls 124 of the eyelet pot which are conical in form extend to the bases 125 and 126 of the pot. It has been found desirable that this inclined surface should extend all of the way to the bases in order that delivery of the eyelets through the combs may be certain. To the sides of the pot near the opposite bases are secured the combs 127 through which the eyelets are swept by the brushes 128 into the eyelet chutes C. The plates 129 are pivoted to the said combs 127 at their upper ends and are secured in place by spring pins 130 which engage holes in the lower ends of said plates 129. Upon withdrawing the spring pins 130 the plates 129 may be swung out so that access may be had to the combs to free any clogged eyelets. The eyelet chutes C lead the eyelets down from the eyelet pot to opposite sides of the anvil plate A and deliver them to the eyelet sets S. The eyelet pot is provided with an opening normally closed by a lid which may be turned to one side to permit supplying the eyelet pot with eyelets. The brushes 128 are secured to the main portion 131 of the brush shaft illustrated in detail in Fig. 15. This brush shaft is mounted in a bearing in the front base 125 of the eyelet pot and extends rearwardly therefrom and is provided on its rear end with a disk 132 provided with three holes adapted to register with three projections 133 from the disk 134 of the auxiliary brush shaft 135 mounted in bearings in the eyelet pot bracket 141 hereinafter referred to; see Fig. 16. Upon the rear end of the auxiliary brush shaft 135 is secured the crank 136 which is connected by means of the link 137 with the stud 138 in the upper end of the feed cam lever 52. By these means oscillations are imparted to the brushes. Other means may be employed if desired to oscillate the brushes. The pins 133 are arranged irregularly, as seen in Fig. 13, so that they shall register in only one position with the holes in the disk 132 of the brush shaft, thereby securing the proper position of the brushes in the eyelet pot, so that they shall sweep over the combs 127. The rear base 126 of the eyelet pot consists of a thin plate of metal provided with a handle 139 by means of which it may be removed to examine the contents or the mechanism on the inside of the eyelet pot when desired. The spring 140 is employed normally to press upon said plate 126 to hold it in proper position.

The eyelet pot bracket 141 is provided with three locking members 142 which engage corresponding locking members 143 on the eyelet pot. The members 143 extend beyond the general outline of the pot, and the arrangement of the said interlocking members is such that by turning the eyelet pot about its axis the interlocking members 142 and 143 may be disconnected from each other to permit the removal of the eyelet pot from the machine. The bracket 141 is provided with a base 144 secured to an eyelet pot lever 145 mounted upon a pivot stud 146 supported in bearings in the frame of the machine. The base 144 is provided with two screw-threaded holes 147 which receive bolts 148 which pass through slotted holes, see Fig. 1, in a lug 149 projected upward from the eyelet pot lever 145. An adjusting screw 150 is screwed into the lug 149 and provided with an extended collar which engages a groove in the base 144 by means of which the eyelet pot bracket may be adjusted when the bolts 148 are loosened. The screw 150, it will be noted from an examination of Figs. 1, 24 and 27, is adapted to adjust the eyelet pot bracket, and thereby the eyelet pot and eyelet chutes, so as to move them laterally in the plane of motion of the chutes and at right angles to the line of motion of their eyelet delivering ends. The eyelet pot lever 145 is provided with two arms, one of which extends upwardly and carries upon its upper end an eccentrically mounted stud 151 carrying a cam roll which engages a cam path 152 in the cam disk 40 mounted on the main shaft M of the machine. The lever 145 is provided with a downwardly extended arm to which the eyelet chutes are secured by means of the bolt 154. By loosening the bolt 154 the eyelet chutes may be rotated to disengage the interlocking connections between the eyelet pot bracket 141 and the eyelet pot E. The eccentric stud 151 affords a means for adjusting the position of the eyelet chutes in the line of motion of their eyelet delivering ends and at right angles to the direction of the adjustment above referred to, and the two adjustments contribute to secure the correct presentation of the eyelets to the eyelet sets.

It is desirable in some classes of work in which the eyelets are set in the lower part of the lacing slit and in which lacing hooks are to be set in the upper part of the lacing slit, to set the eyelets in the lower part of the slit and then to throw the eyelet delivering means out of operation so as to prevent the setting of eyelets in the upper part of the lacing slit, the machine continuing, however, to punch holes in the upper part of the lacing slit to receive lacing hooks. To this end the eyelet pot pivot stud 146 is provided with eccentric projections 155, so that by turning the said pivot stud 146 in its bearing in the frame of the machine the center of oscillation of the eyelet pot may be changed to prevent the presentation of eyelets to the eyelet setting devices. By reference to Fig. 10 it will be seen that the path of motion of the delivering end of the eyelet chutes C, as indicated at 156, is such as to cause the eyelet chutes to deliver eyelets to the eyelet sets. When the center of oscillation of the eyelet pot lever is moved by turning the stud 146 in its eccentric bearings in the frame of the machine, the path of motion of the delivering end of the eyelet chutes is changed to that indicated at 157 so that although the eyelet chutes continue to oscillate, their path of motion is so changed that they are prevented from presenting eyelets to the eyelet sets.

The means for securing the throw-out of the eyelet delivering means are constructed as follows:—The lower end of the pivot stud 146 is provided with a pinion 158, and upon a bracket 159 secured to the frame of the machine is pivoted the segmental pinion 160 which meshes with the pinion 158 and by means of which the said pinion is adapted to be turned. It is desirable in this class of machines to reduce the work done by the operator to as small an amount as is possible and according to the present invention the eyelet delivering throw-out is operated automatically by the machine itself, so as to relieve the operator of this duty, besides which, by making the throw-out mechanically operated, the further advantage is secured of timing it with precision with relation to the operation of the parts of the machine. In machines of this character which operate at a high speed a complete cycle of operations occurs in an extremely short space of time and as a consequence it is difficult for the operator to throw out the eyelet delivering means at precisely the correct time during the revolution of the machine.

According to the construction illustrated in the drawings a pawl 161 is pivotally mounted upon the stud 151 of the eyelet pot cam lever which is adapted when thrown in operation by the operator to engage a tooth 162 on the side of the arm 163 secured to the said segmental pinion 160, thus in timed coöperation with the parts of the machine the segmental pinion is automatically rotated mechanically and the center of motion of the eyelet pot is moved so as to prevent the presentation of eyelets to the setting devices. This occurs, when the eyelet chutes standing in their retracted position at the rear of the path of motion 156 start forward to present eyelets to the sets, and as a result of the combined movement of the eyelet pot lever 145 due to the operation of the cam path 152 thereon and to the rotation of the said eccentric stud 146, the movement of the delivery end of the eyelet chutes is only from the position at the retracted end of the path of motion 156 to the position at the front end of the path of motion 157, after which in the continued operation of the machine the delivering ends of the eyelet chutes oscillate along the path of motion 157. The pawl 161 above referred to is connected with the bracket 159 by means of a spring which normally tends to move such pawl in the direction to prevent it from engaging the tooth 162 on the arm 163. A rod 164 is provided which is adapted to be lifted by the operator to raise the end of the pawl from the position illustrated in Fig. 2 to the position illustrated in Fig. 10. After the segmental pinion 160 has been moved by the means described to the position illustrated in full lines in Fig. 10, a spring pawl 165 drops in engagement with the shoulder 166 on said segmental pinion 160 and holds the segmental pinion in such position until the rod 164 is again drawn downward, thereby bringing the collar 167 secured to said rod 164 against the face of the pawl 165 and disengaging it from the shoulder 166, thereby releasing the segmental pinion 160 and permitting it to be rotated by the pinion 158, so that the center of the path of motion of the eyelet chutes is returned to its original position. This rotation of the stud 146 is secured by means of a lever 168 secured to the upper end of said stud 146 which is engaged by a spring 169 normally tending to rotate said stud 146 to the position shown in Fig. 2.

The rod 164 is connected by means of a bell crank lever 170, pivoted upon the bracket 68, and a link 171, with the quadrant plate 115. When the operator attempts to oscillate the quadrant plate 115 by the means above described and move it to the position illustrated in Fig. 10, it tends to lift the said rod 164, and thereby tends to lift the pawl 161 into the position illustrated in full lines in Fig. 10. For the reasons which have been explained it is desirable, however, that the pawl 161 should engage and operate the throw-out for the eyelet delivering means at a precise time in the operation of the machine. As the machine is organized and arranged, after the operator has oscillated the quadrant plate 115 or exerted a pressure upon the foot lever which would tend to oscillate it, the next movement of the pawl 161 to the right, bringing the pawl to the position illustrated in full lines in Fig. 10, will cause the pawl to be lifted into the position of the full lines in Fig. 10, so that upon the next rotation of the cam disk 153 the said pawl will move to the position illustrated in dotted lines in Fig. 10, thereby operating the eyelet delivering throw-out.

If it be desired to throw out the eyelet feed without substantially varying the length of feed between successive eyelet holes, the stop pins 116 may be so placed on the quadrant plate 115 as to closely embrace the arm 114, so that a slight movement of the latter under the influence of the treadle will operate the throw-out mechanism.

Sometimes it is desirable to prevent the throw-out of the eyelet delivering means, and a hand-operated device is provided for this purpose consisting of a latch lever 172 pivotally mounted at 173 upon the bracket 68 immediately below the level of the quadrant plate 115 which is adapted to be swung by its handle so as to be moved between the edge of the quadrant plate and the surface 174 of the bracket 68. This constitutes, therefore, a hand-operated throw-out preventer for the eyelet delivering devices.

A mechanically operated automatic throw-out preventer is provided, which is operated by the machine in timed relation to its operations, to prevent the throwing out of the eyelet pot at any other than a predetermined time during the operation of the machine. This mechanically operated throw-out preventer consists of the pawl 175 which engages a tooth 176 on the edge of the quadrant plate 115 and normally prevents the quadrant plate from being moved to the left to throw out the eyelet feed devices. The pawl 175 is pivotally mounted upon the stud 177 screwed into the bracket 68 and is normally pressed by a spring pin 178 in the direction to cause its end to engage the said tooth of the said quadrant plate. The pawl 175 is provided with an operating arm 179 which is projected upward, lying upon the projection 67, above referred to, in position to be engaged by the collar 64 of the stud 63 projected downwardly from the feed frame or support F. The arm 179 is concaved at 180, opposite the collar 66 when the feed frame is in the position illustrated in Fig. 5, so that after the return movement or back feed of the feed frame or support to the position illustrated in Fig. 5, said collar 64 does not engage the said arm 179 and release the pawl 175 from engagement with the quadrant plate 115, but when the feed frame or support F rises from the position illustrated in Fig. 5 to the position illustrated in Fig. 10, the said collar 64 engages the end 181 of the arm 179 and pushes it back, thereby releasing the pawl 175 from engagement with the quadrant plate 115 and permitting it to be moved to the left to throw the eyelet pot out of operation.

The general operation of the eyelet delivering throw-out is as follows:—The operator bears upon the treadle, which moves the lever 114 to the left and into engagement with the left-hand stop pin of the quadrant plate and therefore tends to move the quadrant plate to the left. After the feed frame or support F has risen to move the eyelet sets from their original position to the position just previously occupied by the punches, the pawl 175 is released from engagement with the tooth 176 of the quadrant plate, and the lever 114 then moves the quadrant plate to the left, thereby raising or tending to raise the rod 164 to lift the pawl 161, but at this precise time the pawl 161 will have moved to the left so far that its tooth will have passed by the edge of the tooth 162 on the arm 163 and not until after the eyelet chute has been moved outwardly again will the pawl be in position to engage the said tooth 162, that is to say, after the operator makes the movement which eventually results in the throwing out of the eyelet delivering means such movement does not prevent the eyelet delivering means from delivering the eyelet to the eyelet sets at that time but prepares the machine so that automatically upon the next successive revolution of its main shaft the eyelet delivering means are thrown out of operation. As was above suggested this is desirable because it relieves the operator of timing the throw-out movement of the treadle with accuracy in the operation of the machine, and all that is necessary is that the operator should exert the pressure on the treadle at any time in the operation of the machine and then upon the first lifting of the feed frame or support thereafter the machine is prepared to operate automatically, to throw the eyelet delivering means out of operation, and then upon the second lifting of the feed frame which is the time of the second forward movement of the eyelet chutes, the eyelet delivering means are automatically thrown out of operation.

It is important in the operation of eyeleting machines that the machine should always come to rest when the power is disconnected therefrom with the parts in such position that the work may be removed and new work entered therein, and to this end various clutch mechanisms may be employed. The clutch mechanism illustrated in the drawings forms no feature of the present invention, but it has been found to be efficient for operating this machine and is the clutch mechanism in connection with which the invention is preferably embodied. The pulley 182 is loosely mounted upon a short shaft 183 upon which it is free to rotate, the shaft 183 being rigidly supported in an outboard bearing 184 secured to the frame of the machine. Thrust resisting means for taking the thrust upon the pulley are provided consisting of the balls 185 mounted in a cage 186 and adapted to receive the thrust from the pulley and to transmit it to a shoulder on the shaft 183. The pulley is provided with a friction surface 187 which is adapted to be engaged by the friction surface 188 of the clutch disk 189. The opposite side of the clutch disk 189 is provided with a friction surface 190 which is adapted to engage a corresponding friction surface 191 on the frame of the machine. The friction disk 189 is mounted to slide longitudinally upon the main shaft M of the machine but is held from rotation with relation thereto. When the clutch disk 189 is thrown to the right, thereby bringing the surface 188 in contact with the surface 187, the main shaft M will be rotated, and conversely when the clutch disk 189 is moved to the left as seen in said Fig. 4 the friction surface 190 is brought into engagement with the surface 191 of the frame of the machine and the main shaft M is brought to rest. The clutch disk 189 is hollow and is provided with ears 192 projected inwardly, which ears embrace and hold between them lugs 193 rigidly secured to the end of the main shaft M. See Fig. 22. Secured to the clutch disk 189 is a grooved collar 194 by means of which the clutch disk may be moved longitudinally of the shaft M. The collar is engaged by ring segments 195 which are provided with bearings 196 in the upper ends of the clutch lever 197. See Fig. 21. The clutch lever 197 is pivoted at 198 to the frame of the machine and a strong spring 199 mounted in a portion of the frame of the machine bears upon the lower end of said clutch lever normally tending to oscillate it about its pivot in a direction to move the clutch disk 189 into engagement with the friction surface 187 of the pulley 182. A clutch cam lever 200 pivotally mounted at 201 on the frame of the machine carries upon its upper end an eccentric stud 202 which carries a cam roll adapted to be engaged by a cam surface 203, upon one of the lateral faces of the cam disk 40. The lower end of the clutch cam lever 200 is connected by means of toggle links 204 and 205 with the lower end of the clutch lever 197. The toggle link 204 is provided with an extension 206 connected to a spring 207 which normally tends to lift the toggle lever 204 in the direction to straighten the toggle. The extension 206 is also provided with a link 208 connected with a treadle, not shown, by means of which the toggle may be broken. A stop pin 209 is provided for limiting the upward movement of the toggle link 204 so that the central pivot of the toggle link shall not pass beyond the dead center.

When it is desired to start the machine the operator depresses the treadle, thereby breaking the toggle and permitting the spring 199 to move the lower end of the clutch lever 197 to the left as illustrated in Fig. 4, thereby forcing the upper end of said clutch lever to the right and moving the clutch disk 189 out of engagement with the frame of the machine and into engagement with the pulley wheel 182, thereby starting the machine. So long as the treadle is held depressed the machine will continue to run but when the treadle is permitted to rise the spring 207 above referred to will straighten the toggle and then when the cam surface 203 next comes opposite the cam roll on the upper end of the clutch cam lever 200 it will oscillate the lever, and the toggle being straight the pressure exerted thereby upon the clutch lever 197 will compress the spring 199 and withdraw the clutch disk 189 from engagement with the pulley wheel 182 and force it into engagement with the surface 191. These parts are so adjusted that the clutch disk 189 will be forced with great pressure against the frame of the machine and the main shaft M thereon will be brought to rest suddenly in the proper position.

It has not been attempted to describe the clutch mechanism in all its details of construction as it is only important in this connection to describe in a general way a clutch mechanism which will be satisfactory to operate the machine.

Features of the present invention are adapted for use in connection with hook setting machines as well as with eyelet setting machines by variations within the skill of the designer of this class of machines.

Certain features of the present invention are applicable to use in connection with simple eyeleting machines as well as machines in which the eyelets are set in the opposite sides of the shoe upper at one time, and it is not intended by the claims that such feature of the invention should be limited to employment in a duplex eyeleting machine of the character described.

No attempt has been made to illustrate the form of the cam paths and surfaces which operate the several parts of the machine as from the description of the construction, organization and mode of operation of the machine it is perfectly competent for any person skilled in this art to develop such cams without the exercise of anything more than the skill of his calling.

Having thus described the construction, organization and mode of operation of the preferred form of the present invention, but without limiting the invention specifically thereto, what is claimed is:—

1. An eyeleting machine, having, in combination, an eyelet set, a cam, and means for actuating the eyelet set from the cam including a lever provided with a cam roll yieldingly mounted thereon acting during the setting of the eyelets to yield so as to compensate for variations in the thickness of the material, substantially as described.

2. An eyeleting machine, having, in combination, oppositely disposed eyelet sets, an anvil or die plate therebetween, a support for the eyelet sets, a cam, and means for actuating the eyelet sets from the cam including a yielding lever acting during the setting of the eyelets to yield so as to compensate for variations in the thickness of the material, substantially as described.

3. An eyeleting machine, having, in combination, oppositely disposed eyelet sets, an anvil or die plate therebetween, a support for the eyelet sets, a cam, articulated bell crank levers for actuating the eyelet sets, one of said levers being provided with a cam arm, an auxiliary arm pivoted to said cam arm engaging said cam, and yielding connections between said auxiliary arm and cam arm acting to yield during the operation of the eyelet sets, substantially as described.

4. An eyeleting machine, having, in combination, oppositely disposed eyelet sets, an anvil or die plate therebetween, a support for said eyelet sets, a cam, means for actuating the eyelet sets from the cam including a cam arm having an auxiliary arm pivoted thereto for engaging said cam, and a spring between said auxiliary arm and the cam arm adapted to yield during the operation of the eyelet sets, substantially as described.

5. An eyeleting machine, having, in combination, an eyelet set, a support therefor, means for actuating the eyelet set to make its setting stroke, a lever and a spring plunger acting thereon for returning the eyelet set to its inoperative position, substantially as described.

6. An eyeleting machine, having, in combination, an eyelet set, a support therefor, a lever pivoted to said support and having its end engaging said set, a spring plunger acting on said lever operating in a direction normally to withdraw the set from operative position, and independent means for actuating the set, substantially as described.

7. An eyeleting machine, having, in combination, an eyelet set and an anvil, a movable support therefor, means to move the support laterally, and means for holding the said support from movement during the operation of the eyelet set, substantially as described.

8. An eyeleting machine, having, in combination, an eyelet set and an anvil, a support therefor, means for moving the support laterally, a rigid member, and coöperating projections and grooves on said rigid member and support acting to steady the support during the setting operation of the set, substantially as described.

9. An eyeleting machine, having, in combination, oppositely disposed eyelet sets, a support therefor, and auxiliary steadying means for steadying the support during the setting operation of the sets, substantially as described.

10. An eyeleting machine, having, in combination, oppositely disposed eyelet sets, a support therefor movable in a plane, a stationary member, and a stud for connecting said stationary member and movable member during the eyelet setting operations, substantially as described.

11. An eyeleting machine, having, in combination, oppositely disposed eyelet sets, a support therefor movable in a plane, and a stationary member, said support and stationary member coöperating to steady the support during the setting operation of the sets, substantially as described.

12. An eyeleting machine, having, in combination, oppositely disposed eyelet sets, a support therefor, means for actuating the eyelet sets, and thrust resisting means connected with the support to resist the longitudinal thrust of either of said sets, substantially as described.

13. An eyeleting machine, having, in combination, a work engaging tool, and actuating means therefor including a pivotally jointed spring lever, substantially as described.

14. An eyeleting machine, having, in combination, a work engaging tool, a lever and a spring plunger acting on said lever to withdraw said tool from operative position, and independent means for actuating the tool, substantially as described.

15. An eyeleting machine, having, in combination, a punch, an eyelet set, a support for said punch and eyelet set, levers pivoted to said support and connected to said punch and eyelet set, and springs acting on the levers normally to withdraw the punch and set from operative position, and means for actuating said punch and eyelet set, substantially as described.

16. An eyeleting machine, having, in combination, a work engaging tool, a lever for actuating said work engaging tool, and a face piece provided with a curved shank secured in a correspondingly shaped recess in said lever for actuating said tool, substantially as described.

17. An eyeleting machine, having, in combination, an eyelet set, a support therefor, a lever for actuating said eyelet set, and a face piece provided with a curved shank adjustably secured in a correspondingly shaped recess in said lever for engaging said set, substantially as described.

18. An eyeleting machine, having, in combination, a punch, an eyelet set, a support therefor, a lever for actuating said punch and eyelet set provided with two face pieces the one projected beyond the other for engaging said punch and set respectively, substantially as described.

19. An eyeleting machine, having, in combination, an eyelet set, a punch, a support therefor, a punch and eyelet set actuating lever, said lever being provided with a punch engaging face piece and a set engaging face piece, said pieces being adjustable on curved lines and having their faces the one projected beyond the other, substantially as described.

20. An eyeleting machine, having, in combination, oppositely disposed eyelet sets, a guide plate for guiding the work on opposite sides thereof to the sets, work holders for engaging and holding the work against the opposite sides of the guide plate, said work holders and guide plate being extended to a position opposite the front of the eyelet sets, substantially as described.

21. An eyeleting machine, having, in combination, oppositely disposed eyelet sets, a support therefor, an anvil or die plate located between the sets, a guide plate secured to said support, and extended to a position opposite the front of the eyelet sets, and work holders engaging the opposite sides of said guide plate, substantially as described.

22. An eyeleting machine, having, in combination, oppositely disposed punches, oppositely disposed eyelet sets, an anvil, a support for said punches, eyelet sets and anvil or die plate, a guide plate, means for supporting said guide plate alongside of the anvil or die plate, and work holders engaging the opposite sides of said guide plate, said work holders and guide plate being projected beyond the plane of said punches and eyelet sets in the direction of feed, substantially as described.

23. An eyeleting machine, having, in combination, oppositely disposed punches, oppositely disposed eyelet sets, an anvil or die plate located therebetween, a support for the punches, eyelet sets and anvil or die plate, means for moving said support substantially in the plane of the said punches and eyelets to move the eyelet sets to the position previously occupied by the punches during their punching operation, a guide plate located alongside the anvil plate, and work holders engaging the opposite sides of said guide plate and work holders, said work holders and guide plate being extended beyond said punches and eyelet sets in the direction of feed, substantially as described.

24. An eyeleting machine, having, in combination, an eyelet set, a support therefor, means for moving the said support while the eyelet set is in engagement with the work, an edge guide, means for moving the edge guide during the feed motion of the eyelet set to vary the distance of the eyelets from the edge of the material, substantially as described.

25. An eyeleting machine, having, in combination, oppositely disposed eyelet sets, a support therefor, and means for actuating them, means for moving the support while the eyelet sets are in engagement with the materials to feed the work, oppositely disposed edge guides for engaging the two edges of the upper, and means for moving the said edge guides during the feed motion of the eyelet sets to vary the distance of the eyelets from the edge of the upper, substantially as described.

26. An eyeleting machine, having, in combination, oppositely disposed punches, oppositely disposed eyelet sets, an anvil or die plate therebetween, a support for said punches, eyelet sets and anvil or die plate, means for moving the support to bring the eyelet sets into the position occupied by the punches during their punching operation and for moving the support to feed the work while the eyelet sets are in engagement with the work, and for returning the support to its original position, oppositely disposed edge guides, and means for moving the edge guides during the feed movement of the support, substantially as described.

27. An eyeleting machine, having, in combination, a punch, an eyelet set, a movable support therefor, means for moving said support to feed the work, an edge guide, means for moving the edge guide with relation to the said support during the feed movement thereof, substantially as described.

28. An eyeleting machine, having, in combination, a punch, an eyelet set, a support therefor, a guide plate normally held in fixed position, an edge guide mounted on said guide plate, and means for moving the guide plate to vary the position of the edge guide with relation to the row of eyelets being set during the operation of the machine, substantially as described.

29. An eyeleting machine, having, in combination, a punch, an eyelet set, a movable support therefor, means for moving said support to feed the work; a guide plate, an edge guide, means for moving said guide plate and edge guide during the feed movement of the said support connected with the said feeding means, substantially as described.

30. An eyeleting machine, having, in combination, punching and eyelet setting means, feeding means, an edge guide, hand-operated means for moving the edge guide to increase the distance of the eyelets from the edge of the material in which the eyelets are set, and automatically operated means for restoring said edge guide to its normal position, substantially as described.

31. An eyeleting machine, having, in combination, punching and eyelet setting means, feeding means, an edge guide, hand-operated means for throwing said edge guide to increase the distance of the eyelets from the edge of the materials in which the eyelets are set, automatically operated means for restoring said edge guide to its normal position, and means for varying the position to which said automatically operated means will move said edge guide, substantially as described.

32. An eyeleting machine, having, in combination, eyelet setting means, an edge guide, hand-operated means for moving the edge guide to increase the distance of the eyelets from the edge of the material in which the eyelets are set, and automatically operated means for restoring said edge guide to its normal position, substantially as described.

33. An eyeleting machine, having, in combination, oppositely disposed punches, oppositely disposed eyelet sets, edge guides, and means for varying the positions of the edge guides during the operation of the machine, substantially as described.

34. An eyeleting machine, having, in combination, oppositely disposed eyelet sets, edge guides, and means for varying the positions of the edge guides during the operation of the machine, substantially as described.

35. An eyeleting machine, having, in combination, punching means, eyelet setting devices, an eyelet pot, chutes for delivering eyelets from the eyelet pot to the eyelet setting devices, an eyelet pot bracket, positive means for oscillating the eyelet pot bracket to present the eyelet chutes to the eyelet setting devices, an eccentric pivot for said bracket and cam-actuated means for turning said pivot to move the chutes so as to prevent them from presenting eyelets to the eyelet sets, substantially as described.

36. An eyeleting machine, having, in combination, punching means, eyelet setting devices, chutes for delivering eyelets to the setting devices, a bracket for supporting said chutes, an eccentric pivot for said bracket and cam-actuated means for turning said pivot to move the chutes from the setting devices, substantially as described.

37. An eyeleting machine, having, in combination, punching means, eyelet setting devices, eyelet chutes for delivering eyelets to the setting devices, positively acting means for moving the chutes to present eyelets to the setting devices and automatic means for changing the position of the path of movement of the eyelet chutes to prevent them from presenting eyelets to the setting devices, substantially as described.

38. An eyeleting machine, having, in combination, punching means, eyelet setting devices, means for delivering eyelets thereto, positively acting means for moving said eyelet delivering means, and automatic means under the control of the operator for changing the position of the path of movement to said eyelet delivering means, substantially as described.

39. An eyeleting machine, having, in combination, punching means, eyelet setting devices, an eyelet pot, eyelet chutes leading from the eyelet pot to the setting devices, a pivoted support for said eyelet pot and chutes, and cam-actuated means under the control of the operator for varying the position of the center of motion of said support, substantially as described.

40. An eyeleting machine, having, in combination, punching means, eyelet setting devices, an eyelet pot provided with a chute for delivering eyelets to the setting devices, a bracket for the eyelet pot, a lever, an eccentrically mounted stud upon which said lever is pivoted, a cam for moving said lever, a pinion mounted on said stud, a segmental gear, and a pawl mounted on a reciprocating part of the machine for turning said segmental gear to change the position of the center of oscillation of said lever, substantially as described.

41. An eyeleting machine, having, in combination, punching means, eyelet setting devices, feeding means, feed regulating means, means for delivering eyelets to the setting devices, an eccentrically mounted support therefor, and connections between the feed regulating means and said support operating to turn said support so as to prevent the delivery of eyelets to the setting devices with a change in the feed, substantially as described.

42. An eyeleting machine, having, in combination, punching means, eyelet setting devices, eyelet delivering means, feeding means, feed regulating means, and cam-actuated means for throwing the eyelet delivering means out of operation connected with the feed regulating means, substantially as described.

43. An eyeleting machine, having, in combination, punching means, eyelet setting means, eyelet delivering means, automatic means for throwing the eyelet delivering means out of operation, and means for preventing the throw-out from taking place at any time except when the eyelet delivering means are withdrawn, substantially as described.

44. An eyeleting machine, having, in combination, punching means, eyelet setting devices, eyelet delivering means, means under the control of the operator for throwing the eyelet delivering means out of operation, and mechanically controlled means for preventing such throwing out except at a predetermined time in the operation of the machine, substantially as described.

45. An eyeleting machine, having, in combination, punching means, eyelet setting means, eyelet delivering means, means for throwing the eyelet delivering means out of operation, feeding means, feed regulating means, connections between the feed regulating means and the means for throwing the eyelet delivering mechanism out of operation, and means for preventing such throw-out at all times except after a hole has been punched and before the feed of the work, substantially as described.

46. An eyeleting machine, having, in combination, punching means, eyelet setting devices, eyelet delivering means, means for throwing the eyelet delivering means out of operation, a support for said punching and setting means, feeding means, feed regulating means, means for moving the support to move the setting devices to the position previously occupied by the punching means, and means for preventing the throw-out of the eyelet delivering means operated by the said motion of the support to permit the throw-out after such motion, substantially as described.

47. An eyeleting machine, having, in combination, punching means, eyeleting means, eyelet delivering means, means for throwing the eyelet delivering means out of operation, manually operated means for setting said throwing-out means in operation, and automatic means for preventing the actuation of the manually-operated means until a particular time in the operation of the machine, substantially as described.

48. An eyeleting machine, having, in combination, a punch, an eyelet set, a movable support therefor, means for moving said support, eyelet delivering means, means for throwing said delivering means out of operation, and a throw-out preventer controlled by the movements of said support, substantially as described.

49. An eyeleting machine, having, in combination, eyelet setting devices, eyelet delivering means for delivering eyelets to the eyelet setting devices, a support for said eyelet delivering devices, and means for adjusting said eyelet delivering devices upon said support in a direction at right angles to the line of motion of their eyelet delivering ends, and also in the direction of said line of motion, substantially as described.

50. An eyeleting machine, having, in combination, eyelet setting devices, an eyelet pot provided with a chute for delivering eyelets to said eyelet setting devices, and a bracket, upon which the eyelet pot is rotatably mounted such bracket and eyelet pot being provided with coöperating interlocking members arranged so that upon a partial rotation of the pot the interlocking members are unlocked and the eyelet pot may be removed from said bracket, substantially as described.

51. An eyeleting machine, having, in combination, eyelet setting devices, and an eyelet pot provided with a chute for delivering eyelets to said eyelet setting devices, said eyelet pot being round in cross section with its axis horizontal and having a contracted waist and inclined surfaces extended from the opposite bases of said pot, substantially as described.

52. An eyeleting machine, having, in combination, eyelet setting devices, and an eyelet pot provided with a chute for delivering eyelets to said eyelet setting devices, said eyelet pot consisting of a shell formed of truncated cones with their smaller ends joined and their larger ends forming the bases of the said pot, substantially as described.

53. An eyeleting machine, having, in combination, a punch, eyelet setting devices, means for delivering eyelets thereto, a cam-actuated eyelet delivering throw-out, feed mechanism, feed regulating mechanism, connections between the feed regulating mechanism and the eyelet delivering throw-out, and a hand-operated throw-out preventer for preventing the movement of the feed adjusting mechanism from operating the throw out, substantially as described.

54. An eyeleting machine, having, in combination, a punch, eyelet setting devices, eyelet delivering means, an eyelet delivering throw-out, automatic means for actuating the throw-out, and a trip under the control of the operator for setting the said actuating means in operation, substantially as described.

55. An eyeleting machine, having, in combination, a punch, eyelet setting devices, eyelet delivering means, and automatic devices for throwing the eyelet delivering means out of operation at a revolution subsequent to that at which the operator makes the movement which sets it in operation, substantially as described.

56. An eyeleting machine, having, in combination, a punch, eyelet setting devices, eyelet delivering means, a throw-out therefor, and automatic means for setting the throw-out in operation operating to defer the action of the throw-out to a subsequent cycle of operations, substantially as described.

57. An eyeleting machine, having, in combination, a pair of oppositely disposed eyelet sets and an anvil or die plate therebetween for setting eyelets in the opposite sides of the upper of a shoe, said sets and anvil or die plate being arranged at right angles to each other and inclined to the horizontal with the faces of the anvil in planes substantially normal to the line of vision of the operator so as to insure the work being held in a corresponding plane while being operated on, substantially as described.

58. An eyeleting machine, having, in combination, an eyelet set, an unyielding anvil or die for coöperating therewith, a cam, and means for actuating the eyelet set from the cam including a yielding lever acting during the setting of the eyelets to yield so as to compensate for variation in the thickness of the material, substantially as described.

59. An eyeleting machine, having, in combination, a work-engaging tool, a lever for actuating the tool, and a face piece provided with a shank secured in a corresponding recess in the lever and adapted to actuating the tool, the shank and recess being curved concentrically with the center of oscillation of the lever, substantially as described.

60. An eyeleting machine, having, in combination, an eyelet set and an anvil, a laterally movable support therefor, means for moving the support laterally, and auxiliary means for supporting the eyelet support against the thrust of the eyelet set, substantially as described.

61. An eyeleting machine having in combination, an eyelet set, an unyielding anvil or die coöperating therewith, and means for actuating the eyelet set comprising a lever connected with the set, an arm pivotally mounted thereon and provided with a cam roll, a spring connecting said arm and lever, and a cam engaging the cam roll, substantially as described.

62. An eyeleting machine having in combination, a swinging feed frame pivotally mounted at one extremity, an eyelet set mounted on the feed frame near its free extremity, means for actuating the eyelet set, and fixed means engaging the free extremity of the feed frame to support it against the thrust of the eyelet set, substantially as described.

63. A duplex eyeleting machine having, in combination, a pair of punches, a pair of eyelet sets, a pair of actuating levers therefor, two pairs of levers operatively connected with the punches and eyelet sets respectively for retracting said parts, actuating means for said levers independent of the punch and eyelet set actuating levers, and means for operating the punch and eyelet set actuating levers, substantially as described.

64. A duplex eyeleting machine, having, in combination, a pair of oppositely disposed eyelet sets and an anvil or die-plate between them for simultaneously setting eyelets in the opposite sides of the upper of a shoe, a frame for the machine, and supporting means mounted on the frame and carrying the eyelet sets, having provision for supporting the eyelet sets in an inclined position and pointing in the general direction of the eye of the operator, whereby the operator is enabled to see the edges of the two sides of the upper in line with each other as they are presented to the sets, substantially as described.

In testimony whereof I affix my signature, in presence of two witnesses.

GEORGE GODDU.

Witnesses:
HORACE VAN EVEREN,
EDWARD S. DAY.